Nov. 18, 1941.                J. J. SUNDAY                2,263,476
              AIR CONDITIONING APPARATUS FOR CARGO TRAILERS
                    Filed Jan. 24, 1940         4 Sheets-Sheet 1

INVENTOR.
JAMES J. SUNDAY
BY
ATTORNEYS

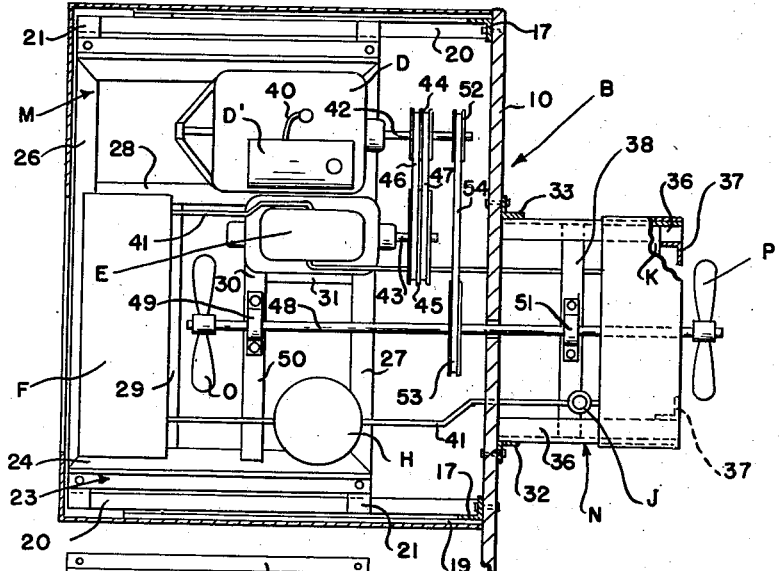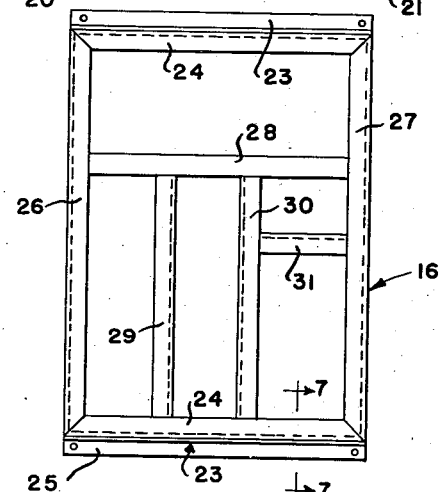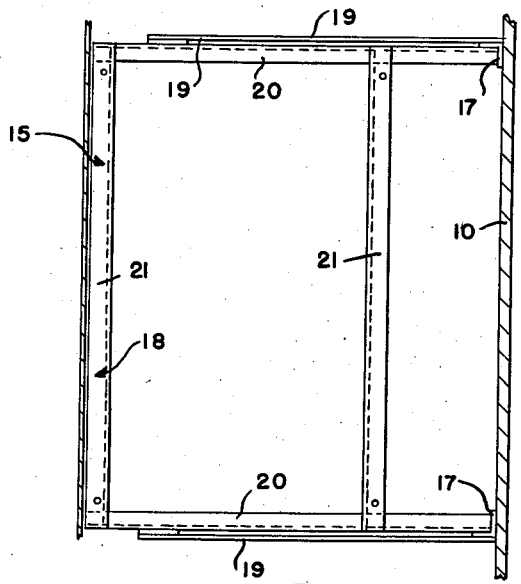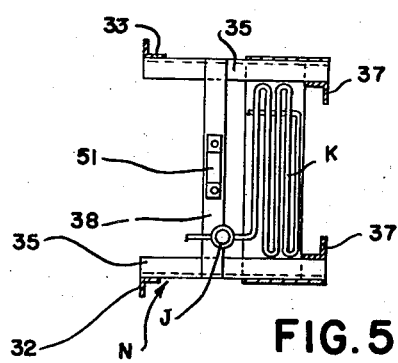

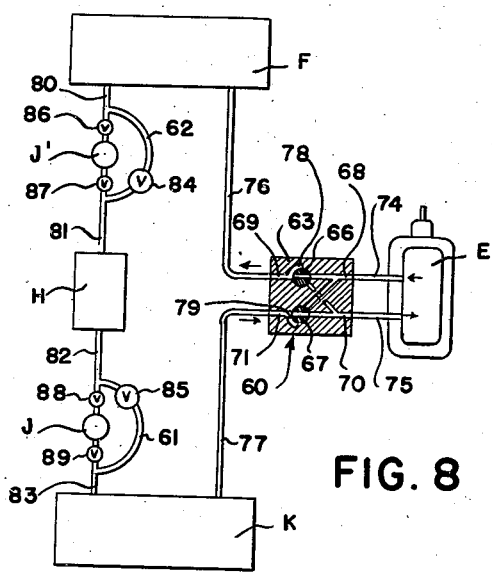

Nov. 18, 1941.  J. J. SUNDAY  2,263,476
AIR CONDITIONING APPARATUS FOR CARGO TRAILERS
Filed Jan. 24, 1940  4 Sheets-Sheet 4
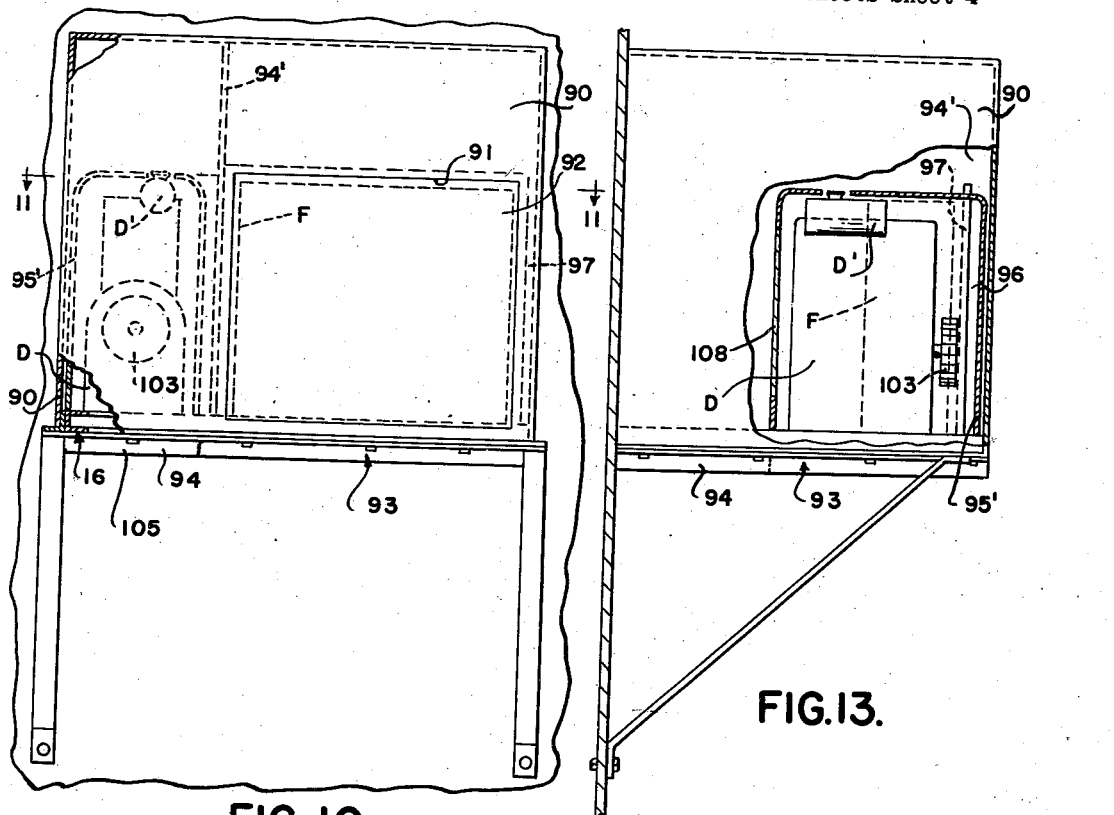
FIG. 10.
FIG. 13.
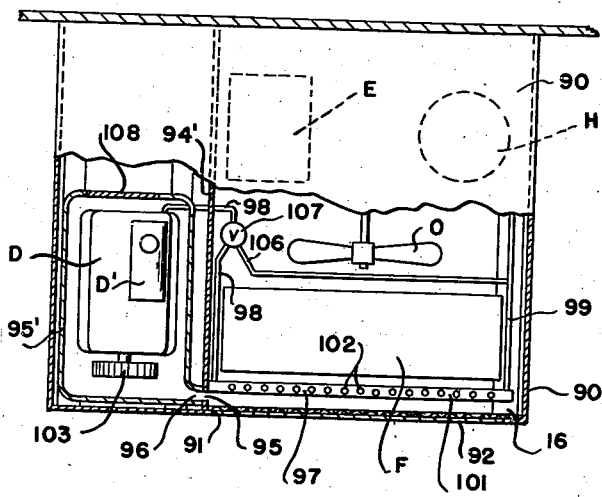
FIG. 11.
INVENTOR.
JAMES J. SUNDAY
BY
ATTORNEYS Patented Nov. 18, 1941

2,263,476

UNITED STATES PATENT OFFICE 2,263,476

AIR CONDITIONING APPARATUS FOR CARGO TRAILERS

James J. Sunday, Detroit, Mich., assignor, by direct and mesne assignments, to Sunday Air Conditioning Company, Milwaukee, Wis., a corporation of Michigan Application January 24, 1940, Serial No. 315,417

9 Claims. (Cl. 257—9)

This invention relates generally to air conditioning apparatus and refers more particularly to apparatus for conditioning the air within vehicles such as cargo carrying trailers of the enclosed type.

One of the essential objects of the invention is to provide an apparatus that can be mounted as a complete self-contained unit upon a wall or other suitable part of the vehicle and that is entirely independent of the tractor or power means of the vehicle.

Another object is to provide an apparatus that can readily be converted from a cooling to a heating means, or vice versa, for the air within the vehicle.

Another object is to provide an apparatus wherein the flow of the cooling medium may be reversed whereby the functions of the condenser and evaporator may be reversed.

Another object is to provide an apparatus wherein heat from the power plant of the apparatus may be utilized to facilitate the heating operation of the apparatus when the reversal aforesaid is made.

Other objects, advantages and novel details of construction of this invention will be made more apparent as this description proceeds, especially when considered in connection with the accompanying drawings, wherein:

Figure 3 is a horizontal sectional view taken substantially on the line 3—3 of Figure 2;

Figure 4 is a horizontal sectional view taken on the line 4—4 of Figure 2;

Figure 5 is a horizontal sectional view taken substantially on the line 5—5 of Figure 2;

Figure 6 is a plan view of the auxiliary frame;

Figure 7 is a sectional view taken on the line 7—7 of Figure 6;

Figure 8 is a diagrammatic view of a slight modification;

Figure 9 is an enlarged fragmentary horizontal sectional view through the crossover valve block;

Figure 10 is a front elevation of another modification;

Figure 11 is a horizontal sectional view taken substantially on the line 11—11 of Figure 10;

Figure 12 is a detail elevation of the radiator;

Figure 13 is an end elevation of the structure illustrated in Figure 10;

Figure 14 is a plan view of the pan illustrated in Figure 13;

Figure 15 is a sectional view taken on the line 15—15 of Figure 14.

Figure 1:
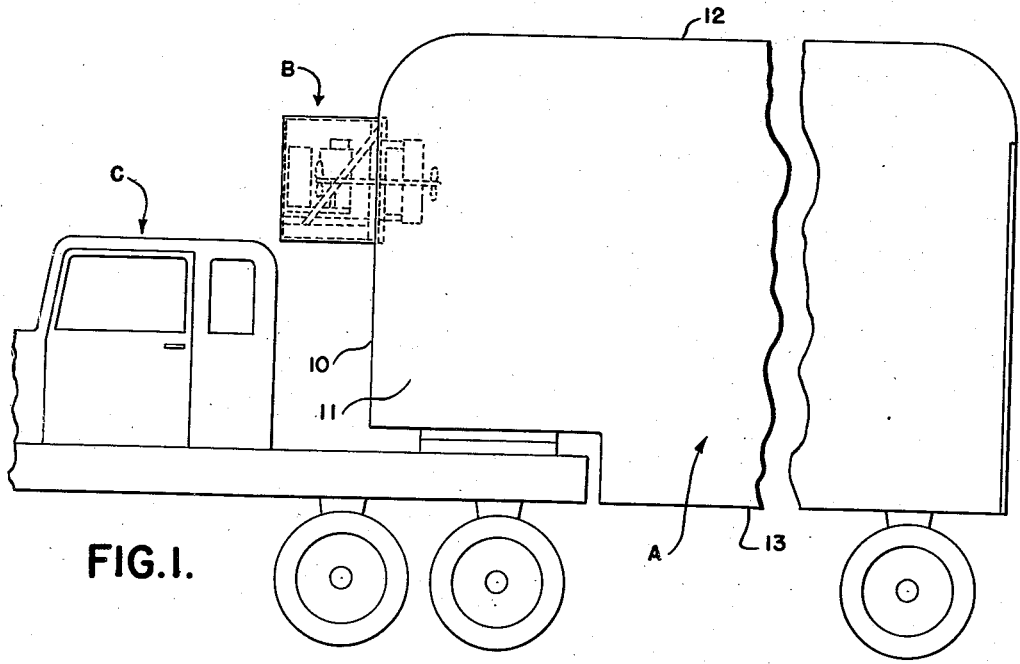
Figure 1 is a side elevation of a truck-trailer combination with apparatus embodying my invention applied thereto.
Figure 2:
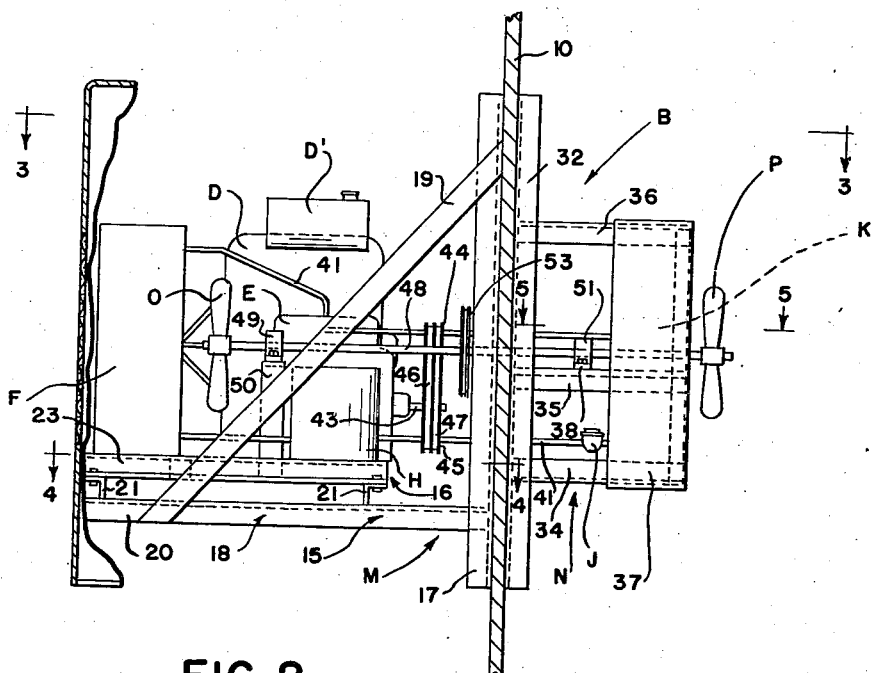
Figure 2 is a vertical sectional view through the trailer and apparatus embodying my invention.

Referring now to the drawings, A is a cargo carrying trailer of the enclosed type, and B is an apparatus embodying my invention.

As shown, the trailer A is coupled to and adapted to be hauled by a suitable tractor C and has front, side, top and bottom walls 10, 11, 12 and 13, respectively. As usual, the rear end of the trailer is open and is provided with suitable doors (not shown).

The apparatus B comprises a gasoline motor D, compressor E, condenser F, liquid receiver H, expansion valve J and evaporator K, and is preferably mounted on the front wall 10 of the trailer. In the present instance, the parts just mentioned may be any approved type or construction for handling a suitable cooling medium, such as sulphurous acid ($SO^2$), sulphur dioxide, ethyl chloride, methyl chloride, etc. Preferably the gasoline motor D, gasoline supply tank D' therefor, compressor E, condenser F and receiver H have a common support M mounted on the outside of the front wall 10, while the expansion valve J and evaporator K have a common support N mounted upon the inside of said wall.

The outside support M comprises a main frame 15 and an auxiliary frame 16. As shown the main frame 15 comprises a pair of laterally spaced uprights 17, a substantially horizontal shelf 18, and diagonal braces 19. Preferably the uprights 17 are angle irons and are rigidly secured to the front wall 10 of the trailer. The shelf 18 is substantially rectangular in plan and is formed of four angle irons. The end pieces 20 thereof are welded or otherwise rigidly secured to the uprights 17 and project forwardly therefrom. The crosspieces 21 are preferably inverted on top of the end pieces 20 and are welded thereto. Preferably one crosspiece 21 is located at the forward edges of the end pieces 20, while the other crosspiece 21 is parallel to the first mentioned crosspiece and is located in forward spaced relation to the uprights 17.

The auxiliary frame 16 rests upon and is bolted to the crosspieces 21 of the shelf 18 and forms a seat for the motor D, tank D', compressor E, condenser F and receiver H. As shown, this auxiliary frame is likewise substantially rectangular in plan and is formed of ten angle irons. At each end of this frame are two angle irons 23 and 24 secured back-to-back, as illustrated in Figure 7. The bases 25 of the angle irons 23 constitute attaching flanges for the frame and are the parts thereof bolted to the crossbar 21 of the main frame 15. Extending between and rigidly secured to the angle irons 24 are two angle irons 26 and 27, while extending between the latter adjacent one end of the frame is an angle iron 28. Two angle irons 29 and 30 disposed between and parallel to the angle irons 26 and 27 extend between and are secured to the angle irons 24 and 28, while a relatively short angle iron 31 extends between and is secured to angle irons 30 and 27. Actually the spacing and arrangement of angle irons is such that the motor D, tank D', compressor E, condenser F and receiver H will fit exactly upon and be anchored to the angle irons of the auxiliary frame 16.

The inside support N is preferably disposed substantially in horizontal alignment with the outside support M and comprises a frame formed of angle irons. As shown, this frame has a pair of laterally spaced uprights 32 and 33 that are secured to the front wall 10 of the trailer, vertically spaced horizontal bars 34, 35 and 36, respectively, that are secured to and project rearwardly from the uprights 32 and 33, connecting bars 37 at the rear ends of said horizontal bars, and an intermediate crossbar 38 that is preferably secured to the intermediate horizontal bars 35 substantially midway their ends. The evaporator K is located within and is anchored to this frame at its rear end, while the expansion valve J is within and anchored to the frame just in advance of the evaporator K.

Any suitable means such as the conduit 40 may be used to conduct gasoline or other suitable fuel from the tank D' to the motor D, while any suitable means such as tubing 41 may be used to conduct the cooling medium from the compressor E to the condenser F, thence to the liquid receiver H, thence to the expansion valve J, thence to the evaporator K, and then back to the compressor E.

In the present instance, the compressor E and suitable fans O and P, respectively, for the condenser and evaporator are driven from the motor D. As shown, the motor D and compressor E have shafts 42 and 43, respectively, provided with double pulleys 44 and 45 over which are trained endless belts 46 and 47. Preferably the condenser F and evaporator K are in alignment and the fans O and P therefor are mounted on opposite ends of a shaft 48 that extends between the condenser F and evaporator K. One bearing 49 for the shaft 48 is carried by a bracket 50 mounted on the frame 16, while another bearing 51 for the shaft 48 is carried by the crossbar 38 of the frame N. Fixed to the motor shaft 42 and to the fan shaft 48 are suitable pulleys 52 and 53 over which an endless belt 54 is trained. Thus, the fans O and P operate in unison when the compressor E is in operation.

In use, the cooling medium employed is forced in the form of a gas from the compressor E to the condenser F where it is air cooled and liquified. The liquid medium so formed then flows to the receiver H and thence to the expansion valve J. Any suitable thermostat (not shown) within the trailer may be operatively connected to the expansion valve J to control the operation thereof so that the supply of liquid medium therefrom to the evaporator K may be regulated. The evaporator K is the cooler for the interior of the trailer and provides for the expansion of the cooling medium. As usual, the liquid medium is converted in the evaporator to a gas and then returns in that form to the compressor E. In fact, gasification of the liquid occurs almost instantly upon its entrance into the evaporator, and this conversion is accomplished by a material reduction of temperature in the trailer.

In Figures 8 and 9 I have illustrated a modification wherein provision is made for reversing the cycle of refrigeration. As shown, a crossover valve structure 60 is connected by tubing to the compressor E, condenser F, and evaporator K, and two expansion valves J and J' with suitable by-passes 61 and 62 are employed. Preferably the crossover valve structure 60 consists of a casting 63 having two laterally spaced bores 64 and 65 for manually operable valve bodies 66 and 67, respectively, a set of aligned passages 68 and 69, respectively, for the bore 64, another set of aligned passages 70 and 71, respectively, for the bore 65, and crossed passages 72 and 73, respectively. The passage 68 is connected by a tube 74 to the outlet of the compressor E, while the passage 70 is connected by a tube 75 to the inlet of the compressor. The passage 69 is connected by a tube 76 to the inlet of the condenser F, and the passage 71 is connected by a tube 77 to the outlet of the evaporator K. Preferably the passages 69 and 71 have short open by-passes 78 and 79 extending about the bores 64 and 65 at substantially diametrically opposite points of the cross passages 72 and 73 so as to permit the cooling medium to flow from said crossed passages via the by-passes to the passages 69 and 71. The crossed passages 72 and 73 are in different vertical planes in the casting 63 and are terminally connected to the bores 64 and 65 and passages 68 and 70.

The expansion valves J and J' are between and adjacent to the evaporator K and condenser F, while the by-passes 61 and 62 are around said expansion valves. Preferably the expansion valve J' is between and connected to sections 80 and 81 of tubing extending from the condenser F to the receiver H, while the expansion valve J is between and connected to sections 82 and 83 of tubing extending from the receiver H to the evaporator K. The by-pass 62 extends from section 80 around expansion valve J' to section 81 and is provided with a manually operable valve 84, while the by-pass 61 extends from section 82 around expansion valve J to section 83 and has a manually operable valve 85. If desired, additional manually operable valves, such as 86 and 87 may be provided in the sections 80 and 81 between the expansion valve J' and the by-pass 62, and manually operable valves 88 and 89 may be provided in the sections 82 and 83 between the expansion valve J and by-pass 61.

Thus, when the passage 66ª in the valve 66 is in alignment with passages 68 and 69, and the passage 67ª in the valve 67 is in alignment with passages 70 and 71, as illustrated in Figure 8, then by-pass valve 84 is opened, valves 86 and 87 are closed, by-pass valve 85 is closed, and valves 88 and 89 are opened so that the cooling medium will flow in its normal cycle from the compressor E through the condenser F, receiver H, expansion valve J and evaporator K in the order named and thence back to the compressor. However, when the passage 66ª in the valve 66 is in alignment with passage 73, and passage 67ª in valve 67 is in alignment with passage 72, as illustrated in Figure 9, then by-pass valve 84 is closed, valves 86 and 87 are open, by-pass valve 85 is open, and valves 88 and 89 are closed so that the cooling medium will flow in a reverse cycle, i. e., the evaporator K on the inside of the trailer will receive the cooling medium in gaseous form from the compressor E and thus becomes a condenser which will deliver heat into the trailer. The expansion valve J is cut out, expansion valve J' is cut in, and the condenser F becomes an evaporator.

From the foregoing it will be apparent that this modified apparatus may be used during warm weather to cool the interior of the trailer or may be used during freezing weather to raise the temperature within the trailer above freezing. For example, the trailer may carry during the summer a cargo of foods that require refrigeration to maintain them in proper condition upon reaching their destination. The normal cycle would then be used. Likewise, such trailer may during the winter carry foods that would spoil if frozen or that require a temperature above freezing. In this instance, the reverse cycle described would be used so that heat instead of cold would be delivered within the trailer.

In Figures 10 to 15, inclusive, I have illustrated another modification wherein heat from the gasoline motor D used in the apparatus to drive the compressor E, etc., is utilized for warming sufficiently the condenser F on the outside of the trailer when it is used as an evaporator during the reverse cycle operation just described. Preferably air heated by the motor D and heat from the exhaust gases from the motor are used to heat the condenser-evaporator F. As shown, the motor D, gas tank D', compressor E, condenser-evaporator F and receiver H have a common substantially rectangular-shaped housing 90 which is open at the bottom and is mounted on the frame 16. At the front of this housing 90 is a screened opening 91 substantially equal or slightly larger in area than the condenser-evaporator F and having a removable door 92. On the underside of the frame 16 is a removable pan or closure 93 having a trough 94 substantially L-shape in plan. Within the housing 90 between the motor D and condenser-evaporator F is a partition 94' having an opening 95 at the front thereof just in advance of the condenser-evaporator F. Also within the housing 90 is a shroud 95' for the motor having a duct 96 for air extending to the opening 95 in the partition. In advance of and substantially parallel to the condenser-evaporator F is a radiator 97 which is connected by a suitable conduit 98 to the exhaust manifold of the motor D. Any suitable conduit 99 may be used to conduct the exhaust gases from the radiator 97 to a muffler (not shown) or other exhaust outlet to the atmosphere.

Preferably the radiator 97 has upper and lower headers 100 and 101 and is provided between said headers with spaced vertically extending pipes 102. Thus, with this construction the air within the shroud 95' heated by the motor D will be blown by the motor fan 103 through duct 96 and opening 95 to the space within the housing 90 between the door 92 thereof and the condenser-evaporator F and will be drawn rearwardly by the fan O through the radiator 97 and condenser-evaporator F to the trough 94 from which it will be drawn by the engine fan 103 back to the shroud 95'. In this connection it will be noted that the leg 104 of the trough is at the rear of the housing 90, while the leg 105 is beneath the motor shroud 95'.

The heat from the exhaust gases from the motor will be radiated by the radiator 97 against the condenser-evaporator F and will be drawn rearwardly by the fan O through the condenser-evaporator F. Thus, the condenser-evaporator F will be properly conditioned from a temperature standpoint during freezing or cold weather to function more efficiently than if it were exposed to such weather elements. Moreover, the maximum heat will be provided by the apparatus for the interior of the trailer.

To provide for operation of the apparatus during summer or warm weather, there is a by-pass exhaust conduit 106 and a two-way valve 107 at the junction of said conduits so that the exhaust gases may be directed by the valve 107 through the by-pass 106 to the muffler (carried by conduit 99) instead of to the radiator 97. During summer the cooling medium would be directed through its normal cycle, as in Figure 8, so that the condenser F and evaporator K would function as usual. Also during summer the door 92 and bottom pan 93 would be removed so air from the atmosphere could circulate through the condenser F and be discharged downwardly through the open bottom of the housing 90. Likewise, a suitable door 108 of the motor shroud 95' may be opened so that air heated by the motor could be discharged through the open bottom of the housing 90 instead of passing through the duct 96. Thus, the apparatus would serve to cool the interior of the trailer.

What I claim as my invention is:

1. Air conditioning apparatus for vehicles of the closed type, comprising an internal combustion engine, a refrigerant compressor operable by said engine, a refrigerant condenser for the compressed refrigerant, an evaporator for the condensed refrigerant, a frame for supporting the engine, compressor and condenser adapted to be mounted on the outer side of the vehicle, a housing for the engine, compressor and condenser mounted on said frame, the cycle of the refrigerant being reversed so that the condenser is converted into an evaporator, means in the housing for directing air heated by the engine to the space in front of the condenser, means for causing such heated air to flow through the condenser to the rear thereof, and a removable closure for the bottom of the housing carried by said frame and having means for conducting air from the rear of said condenser back to said engine.

2. Air conditioning apparatus for vehicles of the closed type, comprising an internal combustion engine, a refrigerant compressor operable by said engine, a refrigerant condenser for the compressed refrigerant, an evaporator for the condensed refrigerant, a frame for supporting the engine, compressor and condenser adapted to be mounted on the outer side of the vehicle, a housing for the engine, compressor and condenser mounted on said frame, the cycle of the refrigerant being reversed so that the condenser is converted into an evaporator, means for heating the converted condenser including means in the housing for conducting air heated by the engine to the space in front of the condenser, a radiator in heating proximity to said condenser, means for conducting exhaust gases from the engine to said radiator, means for drawing heated air through the radiator from said space to the rear of the condenser, and a removable closure for the bottom of the housing having means for conducting the air from in rear of the condenser back to the engine.

3. Air conditioning apparatus for vehicles of the closed type, comprising a refrigerant compressor, a condenser for the compressed refrigerant, an evaporator for the condensed refrigerant, an internal combustion engine for driving the compressor, the cycle of the refrigerant being reversed so that the condenser is converted into an evaporator, and means for heating the converted condenser including means for radiating adjacent the condenser heat from the exhaust gases of the engine, and means for circulating through the condenser air heated by the engine and air heated by said radiating means.

4. Air conditioning apparatus for vehicles of the closed type, comprising an internal combustion engine, a refrigerant compressor operable by said engine, a refrigerant condenser for the compressed refrigerant, an evaporator for the condensed refrigerant, a housing for the engine, compressor and condenser, the cycle of the refrigerant being reversed so that the condenser is converted into an evaporator, means for supplying to the converted condenser heat from the engine, including means for circulating through the condenser air heated in the housing by the engine, a radiator within the housing in heating proximity to the condenser, and means also within the housing for conducting exhaust gases from the engine to said radiator.

5. Air conditioning apparatus comprising a refrigerant compressor, a condenser for the compressed refrigerant, an internal combustion engine for driving the compressor, an evaporator for the condensed refrigerant, the cycle of the refrigerant being reversed so that the condenser is converted into an evaporator, a shroud for the engine, and means for supplying heat from the engine to the converted condenser including means for circulating through the condenser air heated within the shroud by the engine.

6. In air conditioning apparatus, the combination with a compressor, a condenser and an evaporator in series in a refrigerant circulating circuit, and an internal combustion engine for operating said compressor, of means for operating said refrigerating circuit to heat the evaporator and hence heat the space in which it is located, said means comprising a valve system operable to effect reverse flow of the refrigerant through the entire circuit under the action of the compressor, means for heating the condenser including means for radiating adjacent the condenser heat from the exhaust gases of the engine, and means for circulating through the condenser air heated by the engine and air heated by the radiating means.

7. Air conditioning apparatus for vehicles of the closed type, comprising an internal combustion engine, a refrigerant compressor operable by the engine, a refrigerant condenser for the compressed refrigerant, an evaporator for the condensed refrigerant, an enclosure for the engine and condenser, the cycle of the refrigerant being reversed so that the condenser is converted into an evaporator, means for conducting air heated by the engine within said enclosure toward the converted condenser, and a fan for circulating such heated air about the condenser.

8. Air conditioning apparatus comprising a refrigerant compressor, a condenser for the compressed refrigerant, an internal combustion engine for driving the compressor, an evaporator for the condensed refrigerant, the cycle of the refrigerant being reversed so that the condenser is converted into an evaporator, and means for supplying heat from the engine to the converted condenser including a radiator in heating proximity to the converted condenser, a conduit for conducting exhaust gases from the engine to the radiator, and means for circulating about both the condenser and radiator air that has been heated by said engine.

9. Air conditioning apparatus comprising a refrigerant compressor, a condenser for the compressed refrigerant, an internal combustion engine for driving the compressor, an evaporator for the condensed refrigerant, the cycle of the refrigerant being reversed so that the condenser is converted into an evaporator, a housing for the compressor, condenser and engine, and means for supplying heat from the engine to the converted condenser including means for circulating about the converted condenser air heated by the engine, and means for conducting exhaust gases from the engine into heating proximity to the converted condenser.

JAMES J. SUNDAY.